(12) United States Patent
Batarseh

(10) Patent No.: US 12,042,068 B2
(45) Date of Patent: Jul. 23, 2024

(54) SYSTEM FOR DISPLAYING WHEELS

(71) Applicant: Adel Batarseh, Riverside, CA (US)

(72) Inventor: Adel Batarseh, Riverside, CA (US)

( * ) Notice: Subject to any disclaimer, the term of this patent is extended or adjusted under 35 U.S.C. 154(b) by 0 days.

(21) Appl. No.: 17/896,548

(22) Filed: Aug. 26, 2022

(65) Prior Publication Data

US 2024/0065459 A1 Feb. 29, 2024

(51) Int. Cl.
*A47F 5/08* (2006.01)
*B60B 7/06* (2006.01)
*A47F 7/04* (2006.01)

(52) U.S. Cl.
CPC .......... *A47F 5/0884* (2013.01); *A47F 5/0876* (2013.01); *B60B 7/063* (2013.01); *A47F 7/04* (2013.01)

(58) Field of Classification Search
CPC ........ A47F 5/08; A47F 5/0884; A47F 5/0876; A47F 7/04; B60B 7/063; B62H 3/12; B62H 3/04; B60R 9/10; B65D 85/06; A47B 81/007
USPC ..... 24/582.1, 587.1, 593.1, 596.1, 329, 332, 24/335, 455, 485; 211/23, 89.01
See application file for complete search history.

(56) References Cited

U.S. PATENT DOCUMENTS

| | | | | | |
|---|---|---|---|---|---|
| 1,515,690 A | * | 11/1924 | Marion | ...................... | A47F 7/04 211/23 |
| 1,930,965 A | * | 10/1933 | Christy | ...................... | A47F 5/08 211/94.01 |
| 1,971,152 A | * | 8/1934 | Barmache | ................. | A44C 1/00 24/329 |
| 2,056,878 A | * | 10/1936 | Wincholt | ............... | A47K 10/14 211/89.01 |
| 2,108,347 A | * | 2/1938 | Quarnstrom | .............. | F16L 3/13 211/89.01 |
| 2,455,236 A | * | 11/1948 | Darvie | .................... | A44C 7/004 24/522 |
| 2,532,021 A | * | 11/1950 | Gunderson | ........... | A47F 13/085 211/124 |
| 2,549,200 A | * | 4/1951 | Hooks | .................. | B43K 23/001 211/89.01 |
| 2,926,954 A | * | 3/1960 | Lyon | ......................... | B60B 7/10 301/5.21 |
| 3,548,422 A | * | 12/1970 | Byers | ........................ | E03C 1/33 4/619 |
| 3,967,346 A | * | 7/1976 | Young, Jr. | ............. | A47F 5/0884 211/89.01 |
| 4,194,635 A | * | 3/1980 | Ferrara | ................. | B42F 15/066 211/89.01 |
| 4,413,379 A | * | 11/1983 | Evans | .................... | A47K 10/12 24/3.11 |
| 4,794,675 A | * | 1/1989 | Bisconti | .................... | F16B 2/12 24/522 |
| 5,038,941 A | * | 8/1991 | Bastiaansen | .............. | A47F 7/06 211/32 |
| 5,097,785 A | * | 3/1992 | Zidek | ........................ | E02B 3/26 211/23 |
| 5,695,161 A | * | 12/1997 | Brozak, Jr. | ........... | A47F 5/0884 223/94 |

(Continued)

*Primary Examiner* — Devin K Barnett

(57) ABSTRACT

A system for displaying a wheel that includes the shelf unit that can be mounted on the wall. The shelf unit includes a shelf upon which an inner perimeter of the wheel may be supported. A retainer clip is inserted into the shelf unit and prevents the wheel from sliding off of the shelf.

6 Claims, 4 Drawing Sheets

(56) References Cited

U.S. PATENT DOCUMENTS

| | | | | |
|---|---|---|---|---|
| 6,481,583 B1* | 11/2002 | Black | ............... | B25H 3/04 |
| | | | | 211/89.01 |
| D607,716 S * | 1/2010 | Chiu | ............... | D8/395 |
| 7,861,901 B2* | 1/2011 | Kirschbaum | ...... | A47G 25/0657 |
| | | | | 211/89.01 |
| 8,322,669 B2* | 12/2012 | Brown | ............... | A47B 96/06 |
| | | | | 211/89.01 |
| 8,523,127 B1* | 9/2013 | Bennett | ............... | A63B 60/60 |
| | | | | 248/225.11 |
| 8,561,267 B2* | 10/2013 | Chang | ............... | A44B 11/12 |
| | | | | 211/89.01 |
| D769,107 S * | 10/2016 | McLaren Hall | ............... | D8/373 |
| D961,363 S * | 8/2022 | Richards | ............... | D8/367 |
| 2004/0099624 A1* | 5/2004 | Hein | ............... | A47L 13/512 |
| | | | | 211/89.01 |
| 2009/0145866 A1* | 6/2009 | Panosian | ............... | A47F 5/0838 |
| | | | | 211/85.15 |
| 2011/0260521 A1* | 10/2011 | Watkin | ............... | F16F 15/324 |
| | | | | 301/5.21 |
| 2011/0266862 A1* | 11/2011 | Halle | ............... | F16F 15/345 |
| | | | | 301/5.21 |
| 2015/0250333 A1* | 9/2015 | Schaefer | ............... | A47F 5/08 |
| | | | | 248/205.8 |

\* cited by examiner

SYSTEM FOR DISPLAYING WHEELS

BACKGROUND

Custom wheels are prime products in the realm of automotive accessories. As one might imagine, custom wheels come in a wide variety of styles to match different consumer preferences. Even though many custom wheels are sold online, there is simply no better way to select a custom wheel than by personal inspection. Up until now, a custom wheel showroom used a single piece hook, which was mounted on a wall or other surface, and which was used to hang a wheel and thus allow customers close and personal appreciation of each design and color of wheel available.

The single piece hook is inherently prone to failure. Because of its general design, wheels can easily slide off and fall to the ground. This could lead to a catastrophic failure of the wheel and loss of inventory. And yet, up until now, the single piece hook is used ubiquitously throughout the industry.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

One of the problems with the prior art single piece hook is that it includes a bottom portion and a top portion, each of which form a hook. In the case of the bottom hook, is angled upward and easily allows a wheel to slide downward and away from a wall upon which the hook is mounted upon. The top hook is used to restrain the wheel from moving away from the wall. However, the top hook is typically set at an angle such that the wheel easily slides away from the wall along the bottom hook. This simply makes no sense. Yet another issue with the single piece hook is that, in order to hang a wheel on such a hook, the wheel must be inserted into the top hook at a large angle relative to the wall. This means that any display of a plurality of wheels on a single wall must be spaced vertically so that such insertion angles into the top hook can be accommodated. Today, all of these issues are not only solved, but the reliability of holding a wheel in position is greatly improved. Accordingly, a wheel is much less prone to falling off of a hook as herein described.

Figure 1:
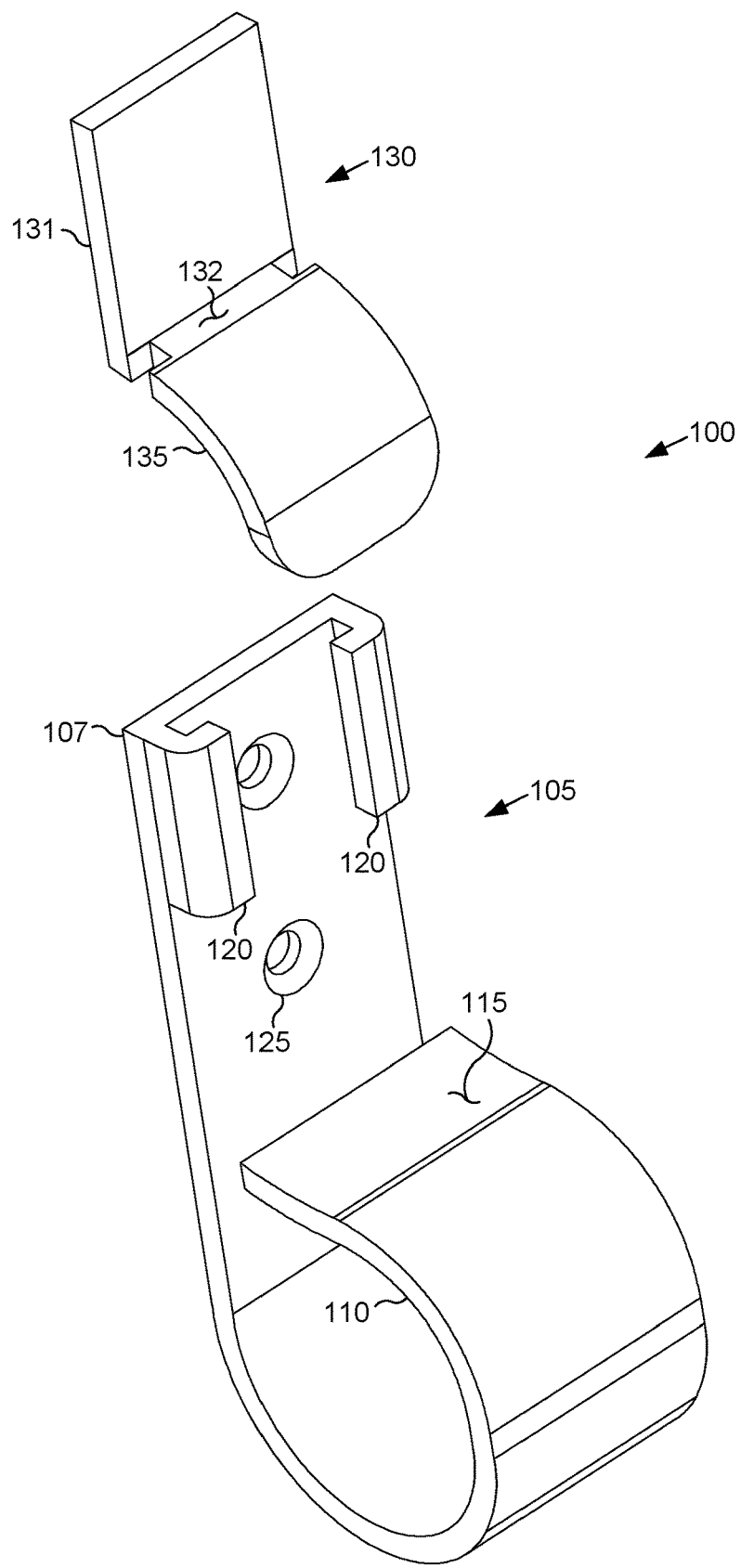
FIG. 1 is a pictorial diagram that illustrates one example embodiment of a system for displaying a wheel.

FIG. 1 is a pictorial diagram that illustrates one example embodiment of a system for displaying a wheel. In this example embodiment, a system for displaying a wheel 100 comprises a shelf unit 105 and a retainer clip 130. In this example embodiment, the shelf unit 105 includes a mounting flange 107, and a horizontal shelf 115 which is substantially orthogonal to the mounting flange 107. In some embodiments, the horizontal shelf 115 protrudes outward from the mounting flange 107. The shelf unit 105 of this example embodiment further includes a retainer receiver 120, which is disposed vertically along the mounting flange 107. The mounting flange 107 also includes one or more holes 125, which are used to receive fasteners to fasten the shelf unit 105 to a surface, for example a wall.

FIG. 1 also illustrates that, according to this example embodiment, the retainer clip 130 includes a retainer slide 131, which is sized to fit into the retainer receiver 120. In one alternative example embodiment, the retainer slide 131 is mechanically attached to a transition member 132 which then continues to a tongue 135. It should be appreciated that, according to another alternative embodiment, the tongue 135 is directly attached to the lower portion of the retainer slide 131.

FIG. 1. Also illustrates that, according to yet another alternative example embodiment, the horizontal shelf 115 is formed by curling the lower portion of the mounting flanged 107 outward and upward to form a pliable region 110 for absorbing shock when a wheel is placed upon the horizontal shelf 115. Furthermore, this pliable region 110 allows the horizontal shelf 115 to bend downward, which effectively provides a cradling action for the wheel. This cradling action further reduces any tendency of a wheel from sliding forward along the horizontal shelf 115. Hence, the wheel is gently held against the mounting flanged 107.

Figure 2:
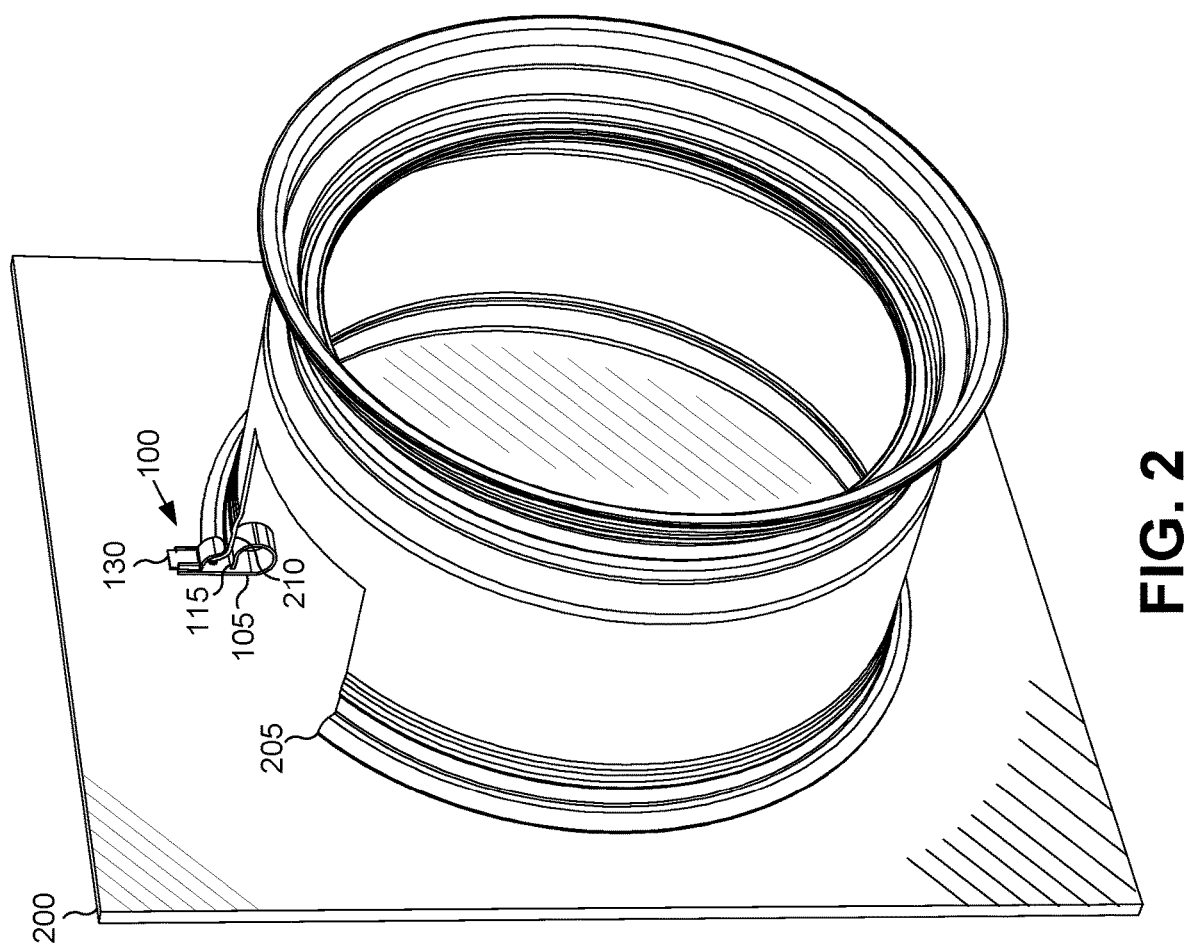
FIG. 2 is a pictorial diagram that illustrates application of one example embodiment of a system for displaying a wheel.

FIG. 2 is a pictorial diagram that illustrates application of one example embodiment of a system for displaying a wheel. According to one illustrative use case, the system 100 is utilized by first attaching the shelf unit 105 to a surface 200 (e.g. a wall). It should be appreciated that the shelf unit 105 is attached to the surface 200 by means of fasteners received through the holes 125 included in the flange portion of the shelf unit 105. After the shelf unit 105 is attached to the surface 200, a wheel 205 is placed on the horizontal shelf 115. Because the retainer clip 130 is installed after the wheel 205 is placed on the horizontal shelf 115, the wheel is placed directly onto the shelf 115 without being set at an angle. This means that the amount of vertical space between wheels on display can be minimized and the number of wheels displayed on a wall can be maximized. As already eluded to, once the wheel is placed on the horizontal shelf 115, the retainer clip 130 is inserted into the retainer receiver and the tongue is then used to hold the wheel from sliding off of the horizontal shelf 115.

Figure 3:
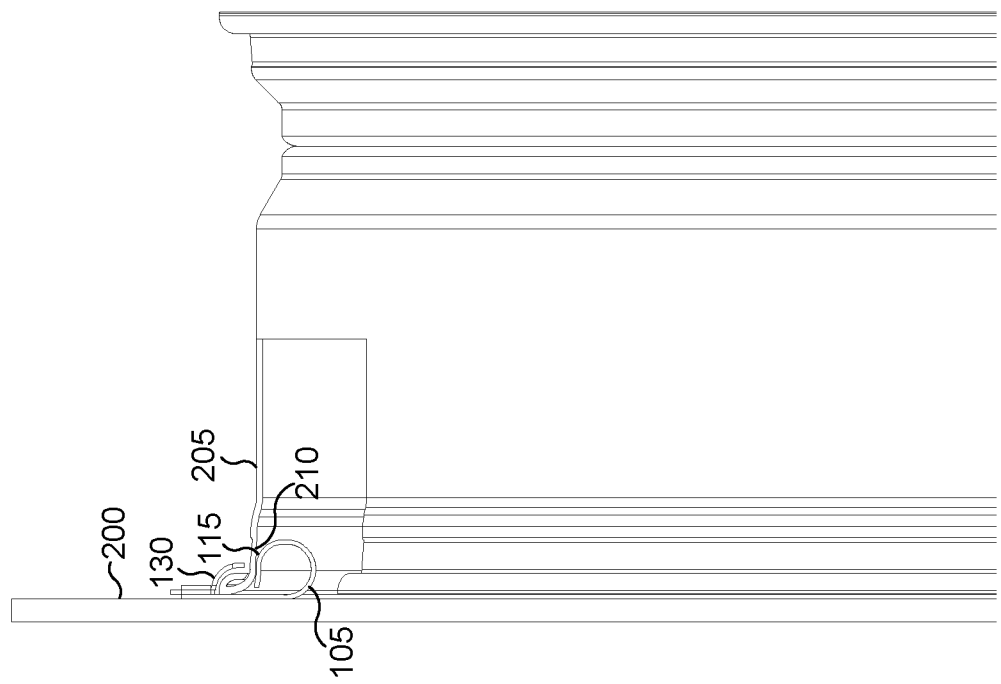
FIG. 3 is a cross-sectional view that depicts the interaction of the present system with a wheel.

FIG. 3 is a cross-sectional view that depicts the interaction of the present system with a wheel. As can be appreciated, the shelf unit 105 is mounted on a surface 200. The shelf unit 105 includes a shelf 115 upon which an inner perimeter of a wheel 205 is brought to rest. Once the wheel has been placed on the shelf 115, the retainer clip 130 is used to preclude the wheel from sliding away from the wall and off of the shelf 115 included in the shelf unit 105.

Figure 4:
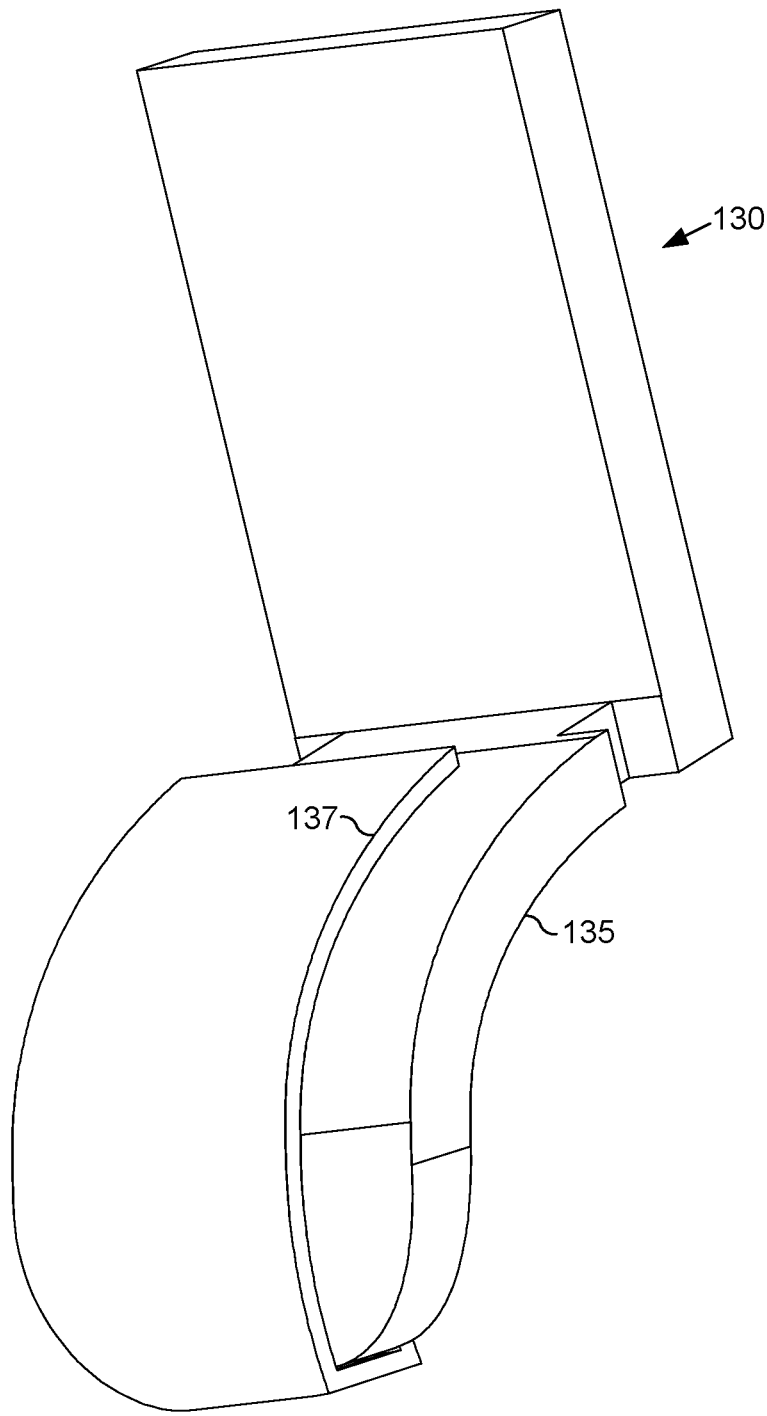
FIG. 4 is a pictorial diagram that illustrates application of a scuff-guard to a tongue included in a retainer clip.

FIG. 4 is a pictorial diagram that illustrates application of a scuff-guard to a tongue included in a retainer clip. In order to prevent scuffing of a wheel, one alternative example embodiment of a retainer clip 130 includes a tongue 135 that is coated with a pliable material 137. It should be appreciated that any suitable pliable material including at least one or more of rubber, urethane, and/or plastic or other suitable material is contemplated and these examples are not intended to limit the scope of the claims appended hereto. It should also be understood that the figure depicts a cut-away of the scuff-guard and that the scuff-guard in this alternative embodiment follows the entire surface of the tongue 135.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

Unless specifically taught to the contrary, method steps that include the phrase " . . . comprises at least one or more of A, B, and/or C . . . " means that the method step is to include every combination and permutation of the enumerated elements such as "only A", "only B", "only C", "A and B, but not C", "B and C, but not A", "A and C, but not B", and "A and B and C". This same claim structure is also intended to be open-ended and any such combination of the enumerated elements together with a non-enumerated element, e.g. "A and D, but not B and not C", is to fall within the scope of the claim. Given the open-ended intent of this claim language, the addition of a second element, including an additional of an enumerated element such as "2 of A", is to be included in the scope of such claim. This same intended claim structure is also applicable to apparatus and system claims.

What is claimed is:

1. A system for displaying a wheel comprising:
    a shelf unit comprising:
        a mounting flange which includes one or more holes configured to receive fasteners used to mount the shelf unit to a substantially vertical surface;
        a substantially horizontal shelf mechanically attached to a lower portion of the mounting flange and protruding outward from the mounting flange; and
        a retainer receiver disposed vertically along the mounting flange for receiving a retainer clip; and
    a retainer clip comprising:
        a retainer slide configured to be received by the retainer receiver; and
        a tongue mechanically attached to a lower end of the retainer slide and curved outward relative to the mounting flange.

2. The system of claim 1 wherein the horizontal shelf curls outward from the lower portion of the mounting flange and upward to form a pliable region for absorbing shock when a wheel is placed upon the horizontal shelf.

3. The system of claim 1 wherein the tongue is formed to correspond to an inner profile of a wheel rim.

4. The system of claim 1 wherein the retainer receiver includes a c-channel running vertically on either side of the mounting flange.

5. The system of claim 1 wherein the retainer clip further comprises a scuff-guard disposed on the tongue.

6. The system of claim 1 wherein the retainer clip further comprises a scuff-guard disposed on the tongue, said scuff-guard comprising a pliable coating material.

* * * * *